(12) United States Patent
Lotz

(10) Patent No.: US 9,764,405 B2
(45) Date of Patent: Sep. 19, 2017

(54) NOZZLE FOR CUTTING STEEL WORKPIECES

(71) Applicant: Gefam GmbH, Königstein im Taunus (DE)

(72) Inventor: Horst Karl Lotz, Königstein im Taunus (DE)

(73) Assignee: GEFAM, GMBH, Konigstein im Taunus (DE)

( * ) Notice: Subject to any disclaimer, the term of this patent is extended or adjusted under 35 U.S.C. 154(b) by 84 days.

(21) Appl. No.: 14/780,555

(22) PCT Filed: Mar. 27, 2014

(86) PCT No.: PCT/EP2014/056187
§ 371 (c)(1),
(2) Date: Sep. 28, 2015

(87) PCT Pub. No.: WO2014/154819
PCT Pub. Date: Oct. 2, 2014

(65) Prior Publication Data
US 2016/0052075 A1    Feb. 25, 2016

(30) Foreign Application Priority Data

Mar. 27, 2013  (DE) .................. 10 2013 103 128
Jun. 21, 2013  (DE) .................. 10 2013 106 511

(51) Int. Cl.
*B23K 7/00*     (2006.01)
*F23D 14/42*   (2006.01)
(Continued)

(52) U.S. Cl.
CPC ............... *B23K 7/00* (2013.01); *B05B 1/005* (2013.01); *F23D 14/42* (2013.01); *F23D 14/54* (2013.01)

(58) Field of Classification Search
CPC ........................................... B23K 7/00
(Continued)

(56) References Cited

U.S. PATENT DOCUMENTS 4,501,624 A  *  2/1985  Lotz ..................... B22D 11/126
                                              148/195
4,653,731 A  *  3/1987  Broden .................. F23D 14/54
                                              266/48

(Continued)

FOREIGN PATENT DOCUMENTS

WO    2011-103923 A1    9/2011
WO    2012-130290 A1   10/2012

OTHER PUBLICATIONS

ISA/EP, International Search Report for PCT/EP2014/056187 dated Jun. 10, 2014, 4 pages.

*Primary Examiner* — Scott Kastler
(74) *Attorney, Agent, or Firm* — Fish IP Law LLC

(57) ABSTRACT

The invention relates to a nozzle (1) for cutting steel workpieces and workpieces made of iron alloys, comprising a nozzle body (2), wherein the nozzle body (2) has two cutting-oxygen bores (5, 5a), which extend from an inlet side (6) of the nozzle body (2) to an outlet side (8) of the nozzle body (2) in order to form two cutting jets (10, 10a). The double cutting flame cuts the steel more strongly in the so-called groove trail. The cut is thus more effective. This permits an increased cutting speed, which in turn causes a reduction in the heating-gas consumption.

12 Claims, 5 Drawing Sheets

Cross-section A-A

(51) Int. Cl.
*F23D 14/54* (2006.01)
*B05B 1/00* (2006.01)

(58) Field of Classification Search
USPC .......................................................... 266/48
See application file for complete search history.

(56) References Cited

U.S. PATENT DOCUMENTS

| | | | |
|---|---|---|---|
| 4,821,963 A * | 4/1989 | Arnout | F23D 14/54 239/419.3 |
| 4,830,681 A | 5/1989 | Arnout et al. | |
| 5,002,261 A | 3/1991 | Arnout | |
| 5,823,762 A | 10/1998 | Anderson et al. | |
| 6,139,310 A | 10/2000 | Mahoney et al. | |
| 2013/0038001 A1 * | 2/2013 | Lotz | F23D 14/54 266/48 |

* cited by examiner

Cross-section A-A

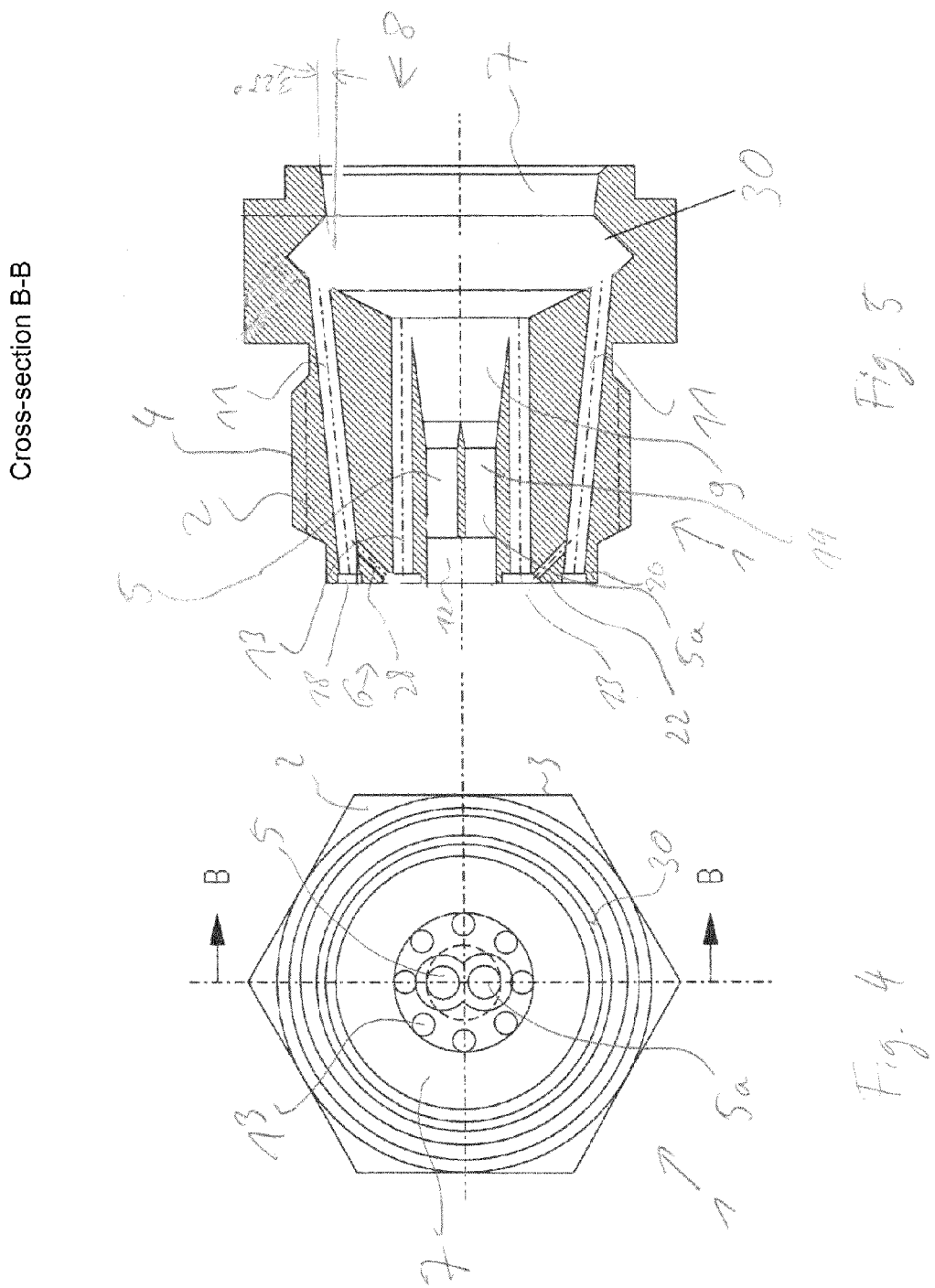

Cross-section A-A

NOZZLE FOR CUTTING STEEL WORKPIECES

FIELD OF THE INVENTION

The invention relates to a nozzle for the cutting of steel workpieces and workpieces made of ferrous alloys.

Oxygen gas cutting torches are provided for cutting steel workpieces and workpieces made of ferrous alloys. Thus, for example, for cutting blocks and slabs. The jet of oxygen and e.g. propane gas ignited as a heating gas flame in the cutting gas burner is directed onto the surface of the metal to be cut. The metal is thereby heated by the heating gas and heating oxygen to its ignition temperature of 1,500° C., and then the cutting oxygen is added and the heated metal is oxidised to effect the cut. The workpiece starts to burn, forming a groove which extends into a cut as the jet proceeds.

As heat is additionally generated, this is referred to as autogenous flame cutting, i.e. there is further pre-heating of the next layers of steel to be cut as a result of the temperature obtained from the burning steel.

Object

The object of the invention is to provide a nozzle which achieves higher efficiency when flame cutting workpieces made of steel and iron alloys.

Solution

This object is solved according to the invention with the characteristics of the independent claim. Advantageous developments of the invention are characterised in the dependent claims. The wording of all claims is hereby incorporated by reference into this description.

The proposed nozzle for the cutting of steel workpieces and workpieces made of ferrous alloys includes a nozzle body. The nozzle body preferably has two cutting oxygen bores which extend from an entrance side for the gases towards an exit side of the nozzle body for the gases to form a cutting jet. But there may also be three or more bores. The nozzle body has a free space, which is bounded by the exit side and into which the cutting oxygen bores open. The flame is formed in this free space, but extends far beyond this free space in order to cut the workpiece. A plurality of heating oxygen bores and heating gas bores are arranged in concentric circles around the two cutting oxygen bores.

The nozzle is typically surrounded by a retaining nut (e.g. a hexagonal nut) for screwing the nozzle onto a cutting torch. With the help of this hexagonal nut, the nozzle is press form-fitted against a flat gasket in the gas lines. The form fitting pressure must be sufficiently high to withstand the pressure of 4-6 bar for the heating gas and heating oxygen, as well as typically 10 bar for the cutting oxygen.

The nozzle body or the cutting torch into which the nozzle body is screwed is so aligned in use that the two cutting oxygen bores, and thus the two cutting jets, are arranged behind one another in the cutting direction.

The cutting operation works strongest and earliest close to the cutting nozzle. If, for example, a slab is being cut at the usual cutting speed of typically several 100 mm/min, then a so-called groove trail is produced the cutting plane in the slab behind the cutting nozzle. The second cutting jet generated by the second cutting oxygen bore takes effect in this groove trail. The second cutting jet effectively blows out the slag that is formed during the cutting process and flows into the groove trail. Therefore, inter alia, less slag remains on the slab.

Moreover, the second cutting jet enhances the cutting action. This deepens the groove trail, thus effectively increasing the cutting action. This makes it possible to increase the cutting speed up to twice the cutting speed of cutting nozzles with only one cutting oxygen channel.

The increased cutting speed results in a lower consumption of heating gas and heating oxygen.

In addition, the flame ring of the heating gas and the heating oxygen, as well as the second cutting jet, dampen the noise resulting from the autogenous burning cutting edge. This results in a significant noise reduction.

Advantageously, the free space is in the form of a concave cup so that the cutting flame may initially develop undisturbed.

If the cup-shaped space and the hexagonal nut are formed in one piece, thus forming an integral nozzle unit, this thus prevents slag being deposited around joints or cracks during the operation of the nozzle in the cutting process.

The bottom of the cup-shaped free space may be concavely cone-shaped. Thus, the jets will be more focused. This results in a further saving of fuel gas and cutting oxygen.

The cone angle may be 116 to 118°. In this case, the cone can be formed in the outlet side with a conventional drill, typically having exactly this angle.

Moreover, a step may be formed at the outlet end of the free space. The expanding gases bounce off this step causing them to be more focused.

A connection channel formed between the heating oxygen bore and the heating gas bore allows the heating gas to be metered by the heating oxygen. In this way, the gases needed for combustion are mixed better, and the combustion becomes more efficient. Thus, the temperature increases in the cutting jet.

Significant noise reduction can be achieved by the wall of the free space by having an internal annular groove whose outlet-side wall is at an angle of about 45° to the centre axis of the nozzle, and which opens into the heating oxygen bore. This means that the burning gas mixture flows uniformly around the trailing edges of the nozzle body.

Further acceleration can be achieved as a result of the pressure drop of the effluent gas when not only the at least two axial bores but also the free space, opens into the outlet side with an opening angle of 6.5 to 7.5°.

The nozzle according to the invention has the further advantage that it may be used simultaneously as a de-burring nozzle. By turning the nozzle according to the invention through 90°, it thus provides a broad flame jet that can burn off the burr arising in the slab at the cutting kerf.

Further details and characteristics will become apparent from the following description of preferred embodiments in conjunction with the dependent claims. The respective characteristics may be implemented on their own or together in combination. The ways to solve the task are not limited to the embodiments. For example, all non-mentioned intermediate values and all conceivable sub-intervals are included in the range specification.

The embodiments are shown schematically in the figures. The same reference numerals in the individual figures denote identical elements or elements that are functionally identical in terms of their functions. Specifically:

FIG. 4 shows an outlet-side end view of a second embodiment of the nozzle;

FIG. 5 shows a sectional view of the second embodiment of the nozzle taken along line B-B in FIG. 4;

FIRST EMBODIMENT

Figure 1:
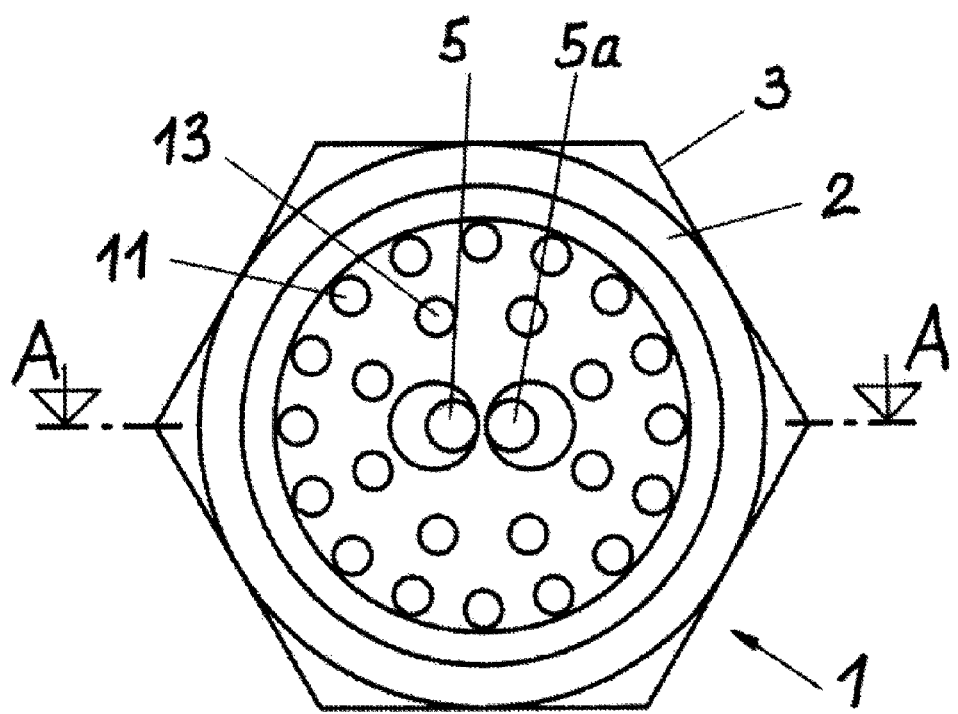
FIG. 1 shows an outlet-side end view of a first embodiment of the nozzle.
Figure 2:
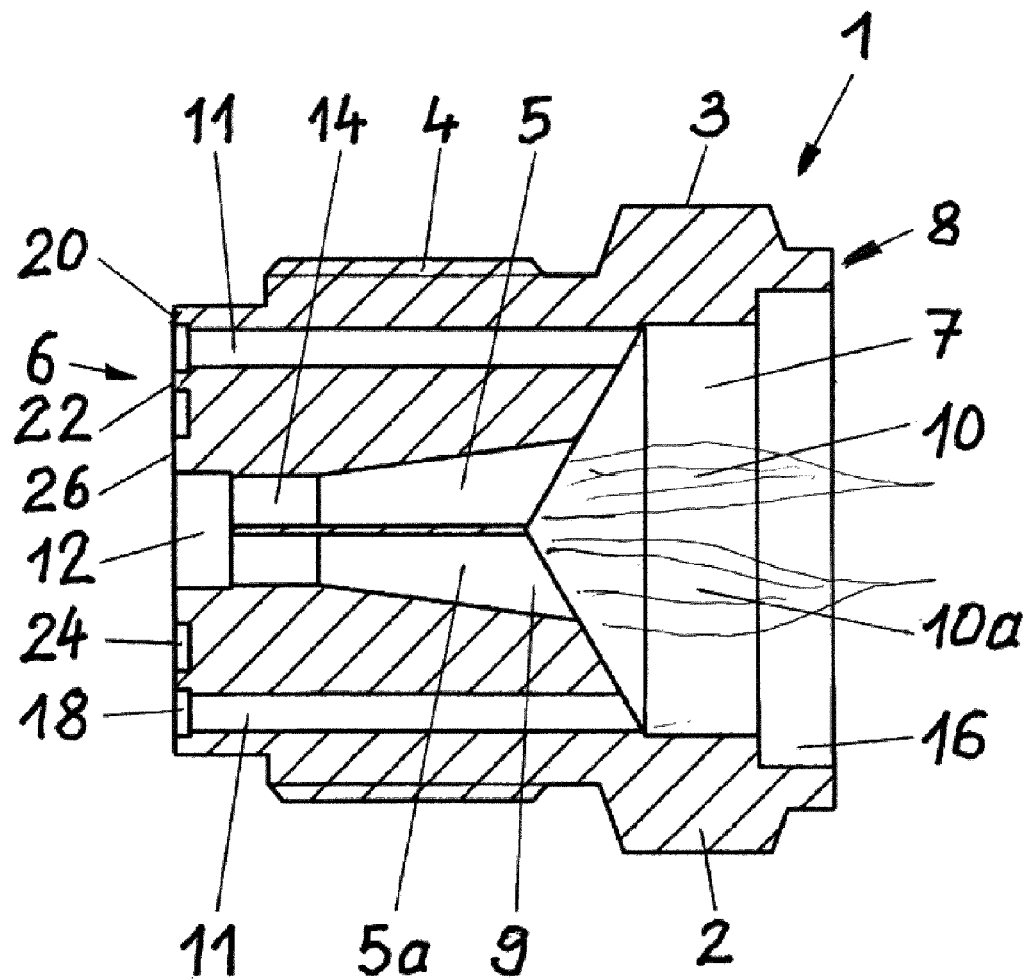
FIG. 2 shows a sectional view of the first embodiment of the nozzle taken along line A-A in FIG. 1.
Figure 3:
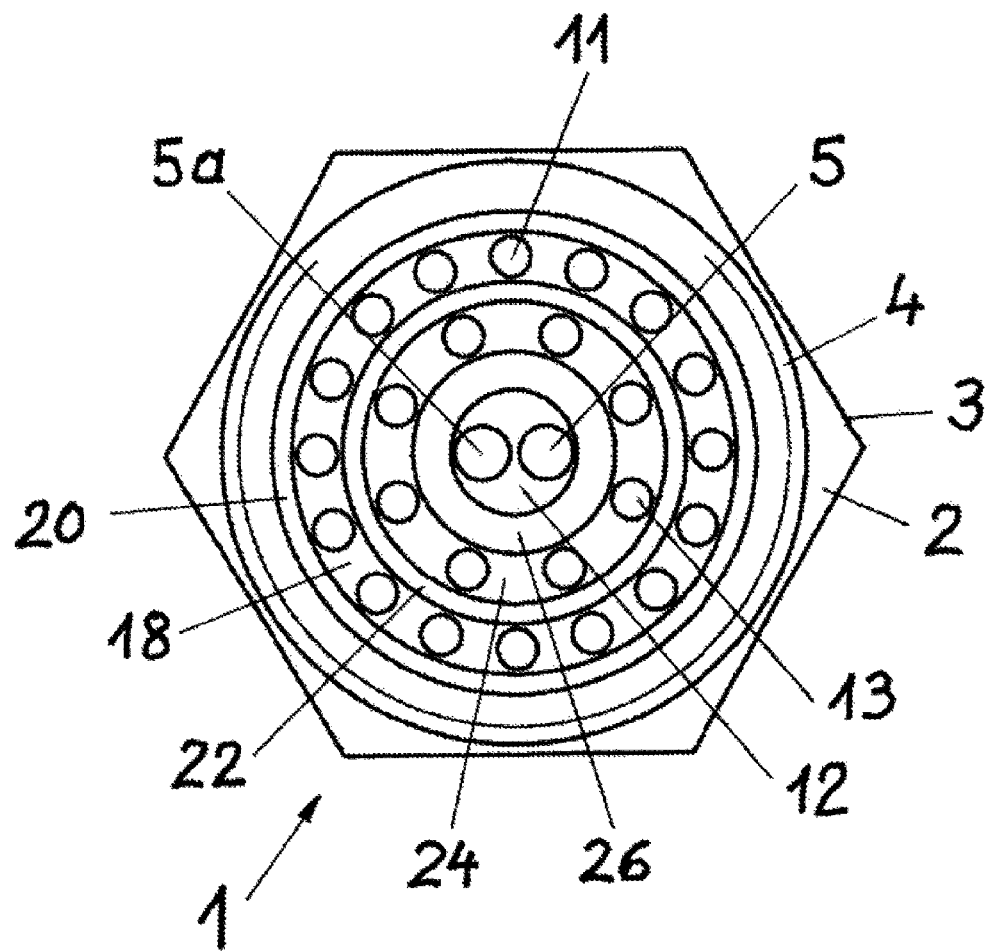
FIG. 3 shows an inlet-side end view of the nozzle of the first embodiment shown in FIG. 1.
Figure 6:
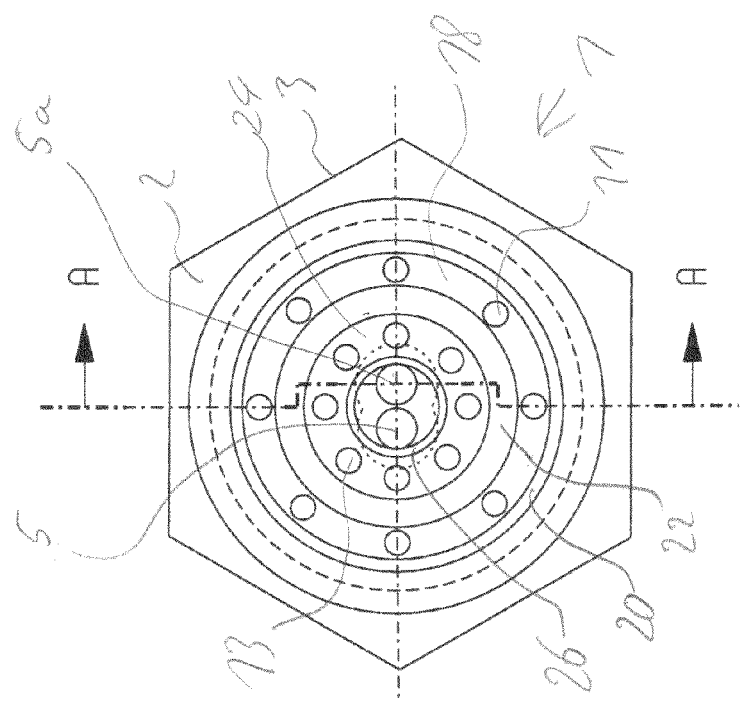
FIG. 6 shows an inlet-side end view of the nozzle of the second embodiment shown in FIG. 4.
Figure 7:
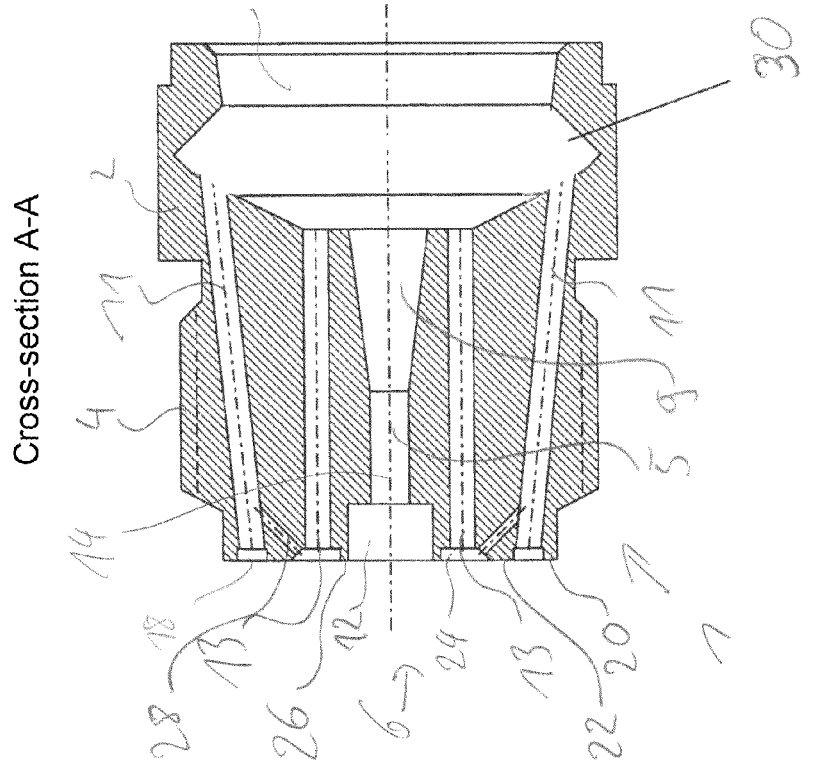
FIG. 7 shows a sectional view of the second embodiment of the nozzle taken along line A-A in FIG. 6.

The nozzle 1 according to FIGS. 1 to 3 has an integrally-formed nozzle body 2. The nozzle body 2 is partially provided peripherally with a hexagonal nut 3 in order to attach this to a cutting torch (not shown) by means of an appropriate tool. Another section of the outer periphery of the nozzle body 2 is provided with an outer thread 4, in order to screw the nozzle 1 on a cutting torch.

The nozzle body 2 has a diameter of typically 30 mm and a height of typically 35 mm and is integrally formed from copper.

Two axial bores 5, 5a for the cutting oxygen are formed at the centre of the nozzle body 2, and extend from the inlet side 6 to a cup-shaped cylindrical space 7 on the outlet side 8 of the nozzle body 2. The outlet side 8 and the cup-shaped cylindrical free space 7 are directly defined and limited by the hexagonal nut 3. The cup-shaped cylindrical free space 7 typically has a depth of 10 mm and a diameter of 20 mm.

The inlet side 6 has a recess 12 out of which two cutting oxygen bores 5, 5a extend. The recess 12 has a diameter of 6 mm and a depth of typically 3-5 mm. There is an impact loss of the cutting oxygen upon entering the axial bores 5, 5a. This impact loss decreases the pressure, wherein the velocity of the gas is increased according to the Bernoulli principle in order to increase efficiency on cutting the steel.

The diameter of the inlet openings of the two cutting oxygen bores 5, 5a is 2.7 to 2.75 mm. There is a substantially parallel throat 14 adjoining the inlet openings of each of the axial bores 5, 5a. The throat leads to another pressure loss and thus to a further increase in the speed of the cutting oxygen.

Following the throat, the two axial bores 5, 5a have a funnel-shaped or conical expansion 9 at the end facing the cup-shaped cylindrical space 7 by means of which the cutting oxygen flowing through the axial bores 5, 5a is accelerated. The conical expansions open at an angle of 6 to 8°, preferably 7°, at the outlet side.

The diameter of the outlet openings of the two cutting oxygen bores 5, 5a is 4.5 mm. The cutting jets 10, 10a are formed at the outlet end of the axial bores 5, 5a as shown in FIG. 2.

The part of the outlet side 8 lying within the cup-shaped cylindrical free space 7 is concavely conically shaped, wherein the cone angle is 118°. In addition, a step 16 is formed at the outlet end of the cup-shaped cylindrical free space 7. The step 16 typically has a depth of 3-5 mm and a width of 1.5-2 mm. The expanding gases bounce off this step to become more focused and prevent slag deposits on the wall of the cup-shaped cylindrical free space 7.

The nozzle 1 comprises a plurality of, typically sixteen, heating oxygen bores 11 which are arranged in an outer concentric circle around the axial bore 5, 5a and not quite parallel to the axial bores 5, 5a and extending from the inlet side 6 of the nozzle 1 to the cup-shaped cylindrical free space 7 of the nozzle body 2. The heating oxygen bores 11 are arranged in an annular channel 18 which is delimited by an outer sealing ring 20 and a central sealing ring 22. The annular channel 18 for the heating oxygen has a width of typically 2.5 mm and a depth of 0.8 mm with respect to the sealing rings ending in a common plane. The sealing rings have a width of typically 1 mm.

Furthermore, a plurality of, typically eight, heating gas bores 13 are arranged in an inner concentric circle around the axial bore and are likewise not quite parallel to the axial bores 5, 5a extending from the inlet side 6 of the nozzle 1 to the cup-shaped cylindrical free space 7 of the nozzle body 2. The heating gas bores 13 are arranged in an annular channel 24 which is delimited by the central sealing ring 22 and an inner sealing ring 26. The annular channel 24 for the heating gas likewise has a width of typically 2.5 mm and a depth of 0.8 mm with respect to the sealing rings ending in a common plane. The elevated sealing rings form a gasket and are pressed against a correspondingly configured flat gas supply.

Each of the bores, namely the axial bores 5, 5a, the heating gas bores 13 and the heating oxygen bores 11 open into the cylindrical free space 7 in which the cutting jets are formed.

SECOND EMBODIMENT

FIGS. 4 to 7 show a second embodiment of the nozzle 1. The matching elements of the nozzle 1 in the two embodiments are identified with identical reference numerals and will not be described again. Only the differences between the two embodiments will be described.

FIG. 5 shows the main innovations of the second embodiment.

On the one hand, a connecting channel 28 can be seen in FIG. 5, which runs between the heating oxygen bore 11 and the heating gas bore 13. The connecting passage has a diameter of 1 mm and extends at an angle of 45° in the direction of the flow from the heating gas bore 13 to the heating oxygen bore 11. The heating gas passes through the connecting channel 28 from the heating gas bore 13 into the heating oxygen bore 11 in a metered fashion.

In this second embodiment, the heating oxygen bore 11 opens into an inner annular groove 30 formed in the wall of the free space 7, wherein the outlet-side wall forms an angle of 45° with respect to the centre axis of the nozzle 1. The inner annular groove 30 directs the heated mixture at an angle of typically 45° inwards into the free space 7. As a result, the heated mixture flows uniformly around the trailing edges of the nozzle body 2. This leads to a significant reduction in noise.

Furthermore, it can be seen in FIG. 5 that the free space 7 opens to the outlet side 8 at an opening angle of 6.5 to 7.5°. In preferred embodiments of FIG. 5, the opening angle is 6.5° corresponding to 3.25° respectively on all sides.

REFERENCE NUMERALS

1 Nozzle
2 Nozzle body
3 Hexagonal nut
4 External thread
5 First axial bore
5a Second axial bore
6 Inlet side
7 Free space 8 Outlet side
9 Conical expansion
10 Cutting jet
10a Cutting jet
11 Heating oxygen bores
12 Recess
13 Heating gas bores
14 Throat
16 Step
18 Annular channel
20 Outer sealing ring
22 Central sealing ring
24 Annular channel
26 Inner sealing ring
28 Connecting channel
30 Inner annular groove

The invention claimed is:

1. Nozzle for cutting steel workpieces and workpieces made of ferrous alloys with:
   a) a nozzle body;
   b) wherein the nozzle body has at least two cutting oxygen bores, which extend from an inlet side of the nozzle body towards an outlet side of the nozzle body to form at least two cutting jets;
   c) wherein the nozzle body has a free space, which is bounded by the outlet side and into which the cutting oxygen bores open; and with
   d) a plurality of heating oxygen bores and heating gas bores, which are arranged in concentric circles around the two cutting oxygen bores; and with
   e) an inner annular groove formed in the wall of the free space, the groove including an outlet-side wall which is at an angle of 45° with respect to the centre axis of the nozzle, and into which the heating oxygen bores open.

2. Nozzle according to claim 1, characterised in that the two cutting oxygen bores are funnel-shaped and open at an angle of 6 to 8° at the outlet side.

3. Nozzle according to claim 1, characterised in that the inlet side has a recess from which the two cutting oxygen bores extend.

4. Nozzle according to claim 3, characterised in that the recess has a diameter of at least 6 mm.

5. Nozzle according to claim 1, characterised in that the diameter of the inlet openings of the two cutting oxygen bores is 2.75 mm.

6. Nozzle according to any of claims 1-5, characterised in that the diameter of the outlet openings of the two cutting oxygen bores is 4.5 mm.

7. Nozzle according to claim 1, characterised in that the free space is concavely cup-shaped.

8. Nozzle according to claim 7, characterised in that
   the nozzle body is partially surrounded peripherally by a hexagonal nut for screwing the nozzle onto a cutting torch; and
   the cup-shaped free space and the hexagonal nut are integrally formed.

9. Nozzle according to claim 7, characterised in that the bottom of the cup-shaped free space is concavely conical.

10. Nozzle according to claim 9, characterised in that a cone angle of the cup-shaped free space is 116° to 118°.

11. Nozzle according to claim 1, characterised in that
    a connecting channel is formed between a heating oxygen bore and a heating gas bore;
    wherein the connecting channel has a diameter of 0.8 to 1.2 mm and is at an angle of 45° to the centre axis of the nozzle, extending in such a way from the heating gas bore to the heating oxygen bore that heating gas passes from the heating gas bore to the heating oxygen bore in a metered fashion.

12. Nozzle according to claim 1, characterised in that the free space opens towards the outlet side with an opening angle of 6.5 to 7.5°.

* * * * *